(12) United States Patent
Varkhedi et al.

(10) Patent No.: US 12,254,303 B2
(45) Date of Patent: Mar. 18, 2025

(54) SYSTEM AND METHOD OF INSTALLING SOFTWARE PRODUCTS ON INFORMATION HANDLING SYSTEMS

(71) Applicant: Dell Products L.P., Round Rock, TX (US)

(72) Inventors: Anil Venkatesh Varkhedi, San Jose, CA (US); Ching-Yun Chao, Austin, TX (US); Bharath Sampath, Morrisville, NC (US)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 18/046,018

(22) Filed: Oct. 12, 2022

(65) Prior Publication Data

US 2024/0126527 A1    Apr. 18, 2024

(51) Int. Cl.
    *G06F 8/61*         (2018.01)
(52) U.S. Cl.
    CPC ...................... *G06F 8/63* (2013.01)
(58) Field of Classification Search
    CPC ..... G06F 8/60; G06F 8/61; G06F 8/63; G06F 8/65
    See application file for complete search history.

(56) References Cited

U.S. PATENT DOCUMENTS

| 2013/0067454 A1* | 3/2013 | Thompson | H04L 67/34 |
| | | | 717/173 |
| 2017/0052771 A1* | 2/2017 | Chen | G06F 8/60 |
| 2017/0242674 A1* | 8/2017 | Hussein | H04L 67/12 |
| 2019/0347121 A1* | 11/2019 | Luo | G06F 9/542 |
| 2022/0391190 A1* | 12/2022 | Ravoor | G06F 8/65 |
| 2023/0214283 A1* | 7/2023 | Young | H04L 67/10 |
| | | | 709/204 |
| 2023/0393826 A1* | 12/2023 | Cai | G06F 8/60 |

OTHER PUBLICATIONS

OASIS MQTT Version 5.0, OASIS Standards Track Work Product, Mar. 7, 2019, 137 pages.

* cited by examiner

*Primary Examiner* — Duy Khuong T Nguyen
(74) *Attorney, Agent, or Firm* — McDermott Will & Emery LLP (57) ABSTRACT

In one or more embodiments, one or more systems, one or more methods, and/or one or more processes may: attain, via a network, a subscription with an intermediary of another datacenter; provide, via the network, a request for a software product to the other datacenter; open a network communication connection with the intermediary; receive a message associated with the software product from the intermediary; close the network communication connection; receive an image associated with the software product from the other datacenter; instantiate the image as an instantiated image; determine if a first repository of the first datacenter stores a package associated with the software product; if so, retrieve the package from the first repository; if not, receive the package from a second repository of the other datacenter via the network; and install, by the instantiated image, the software product from the package on a target information handling system.

17 Claims, 4 Drawing Sheets

SYSTEM AND METHOD OF INSTALLING SOFTWARE PRODUCTS ON INFORMATION HANDLING SYSTEMS

BACKGROUND

Field of the Disclosure

This disclosure relates generally to information handling systems and more particularly to installing software products on information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may attain, via a network, a subscription with an intermediary of a second datacenter; may provide, via the network, a request for a software product to the second datacenter; may open a network communication connection with the intermediary via the network based at least on the subscription with the intermediary; may receive a message associated with the software product from the intermediary via the network, wherein the message is associated with the subscription and is specific to the first datacenter; may close the network communication connection with the intermediary; may receive an image associated with the software product from the second datacenter via the network; may instantiate the image as an instantiated image; may determine if a first repository of the first datacenter stores a package associated with the software product; if the first repository stores the package, may retrieve the package from the first repository; if the first repository does not store the package, may receive the package from a second repository of the second datacenter via the network; and may install the software product from the package on a target information handling system.

In one or more embodiments, the network may include an Internet. In one or more embodiments, the intermediary of the second datacenter may be a message queue telemetry transport (MQTT) message broker. For example, receiving the message associated with the software product may include receiving the message associated with the software product from the intermediary via a MQTT compliant communication protocol. In one or more embodiments, the one or more systems, the one or more methods, and/or the one or more processes may further, if the first repository does not store the package, store the package via the first repository after receiving the package from the second repository. In one or more embodiments, the image may include a container image. For example, instantiating the image as the instantiated image may include instantiating the container image as a container. In one or more embodiments, attaining the subscription with the intermediary of the second datacenter may include subscribing to the intermediary. In one or more embodiments, opening the network communication connection with the intermediary may include utilizing a cryptographic protocol configured to provide communications security over the network.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a container may include an abstraction at an application layer that packages code and dependencies together. For example, multiple containers may execute on a single information handling system and may share an operating system kernel with other containers, where each container may execute as isolated processes in user space. For instance, a contain may utilize less space than a virtual machine. As an example, a container may handle more applications and require fewer virtual machines and operating systems.

In one or more embodiments, a container may include a unit of software that packages up code and all its dependencies such that an application runs quickly and reliably from one computing environment to another. For example, a container image may include a lightweight, standalone, executable package of software, which may include one or more dependencies to run an application. For instance, the one or more dependencies may include executable code, a runtime environment, system tools, system libraries and settings.

In one or more embodiments, a container may virtualize an operating system (e.g., MICROSOFT® WINDOWS®, LINUX®, NETBSD®, FREEBSD®, OS/2®, OpenBSD, Minix, SOLARIS®, Plan 9, MACOS®, etc.). For example, a container may include an application and libraries and dependencies utilized and/or required by the application. In one or more embodiments, a container may be small, quick, and portable compared with a virtual machine. For example, a container may not need to include a guest operating system in each instance. For instance, a container may utilize and/or leverage features and resources of a host OS. In one or more embodiments, a container may permit developers to improve processor and memory utilization of physical information handling systems and/or virtual machines. For example, a container may enable microservice architectures, where one or more application components can be deployed and scaled more granularly. For instance, application components may process information in parallel and may be scaled up to an entire monolithic application.

In one or more embodiments, a container image may become a container at runtime. For example, a Docker container image may become a container when the Docker container image runs on a Docker engine. In one or more embodiments, a container may isolate software from an operating system environment and/or may ensure that the container works uniformly despite differences for instance between a development environment and an execution environment.

In one or more embodiments, an administrator and/or a developer may utilize a computing solution as a container image. For example, a container image may include an application code, supporting software, and/or an infrastructure needed to implement the computing solution. For instance, the container may be deployed with high portability of the code. In one or more embodiments, a cluster may have a number of processors, an amount of memory, and others resources based at least on an information handling system utilized. For example, a cluster may be implemented as a virtual machine on a physical information handling system.

In one or more embodiments, a virtual machine (VM) may include an abstraction of physical hardware. For example, virtual machines (VMs) may be utilized to turn a single physical information handling system into multiple virtual information handling systems. For instance, a hypervisor may permit multiple VMs to execute on a single physical information handling system. As an example, a VM may include a full copy of an operating system, one or more applications, and necessary binaries and libraries, among others. In one or more embodiments, a hypervisor may virtualize physical hardware of a physical information handling system. For example, each VM may include a guest operating system, an instance of virtual hardware of a physical information handling system that an application and the guest operating system need to execute, and libraries. For instance, a first guest operating system may be different from a second guest operating system. As an example, the guest operating system and the second guest operating system may execute in respective different VMs on a single physical information handling system. For instance, the first guest operating system may be a MICROSOFT® WINDOWS® operating system, and the second guest operating system may be a NETBSD® operating system.

Figure 1:
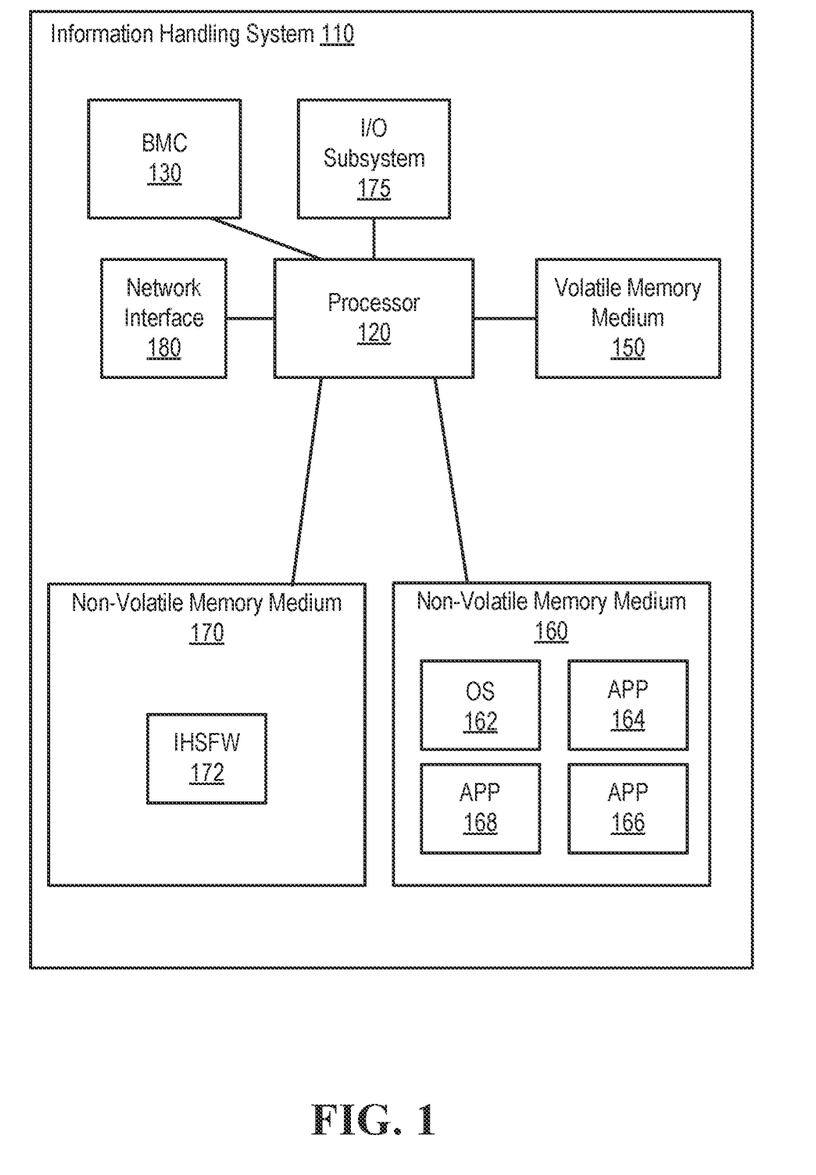
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, a volatile memory medium 150, non-volatile memory media 160 and 170, an I/O subsystem 175, and a network interface 180. As illustrated, BMC 130, volatile memory medium 150, nonvolatile memory media 160 and 170, I/O subsystem 175, and network interface 180 may be communicatively coupled to processor 120.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a REDFISH® standard. In one instance, one or more portions of the remote access controller may be compliant with one or more portions of a REDFISH® standard. In another instance, one or more portions of the remote access controller may implement one or more portions of a REDFISH® standard. A REDFISH® specification and other REDFISH® documentation can be obtained from DMTF (formerly known as the Distributed Management Task Force). In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 2:
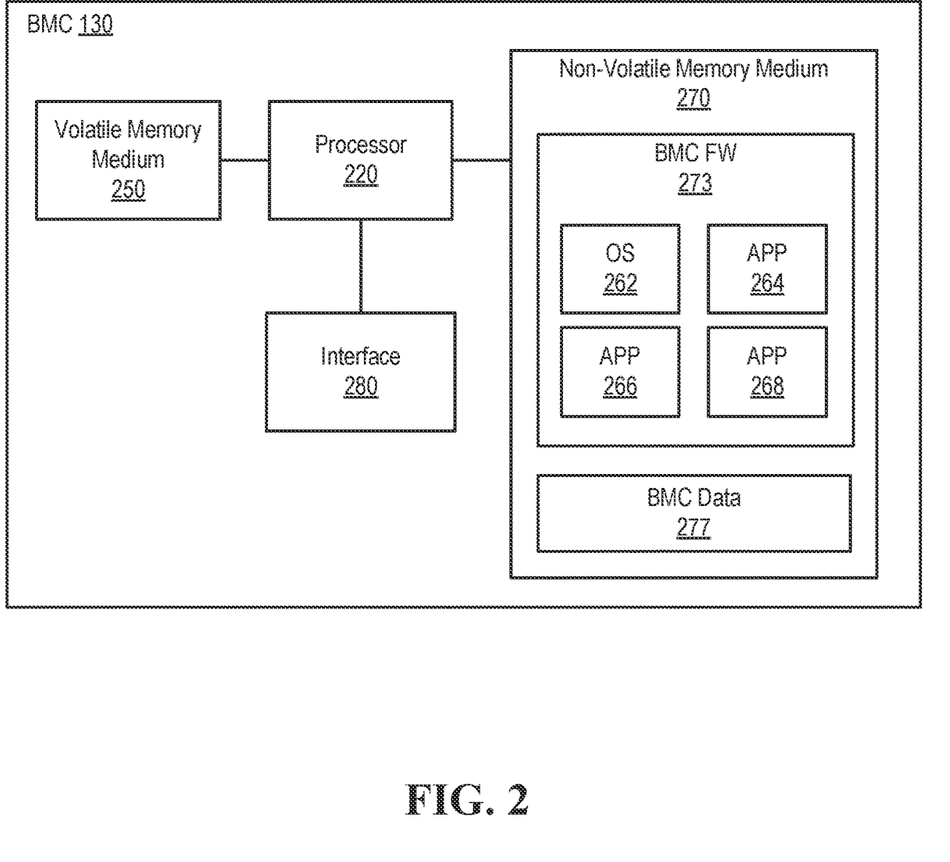
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3:
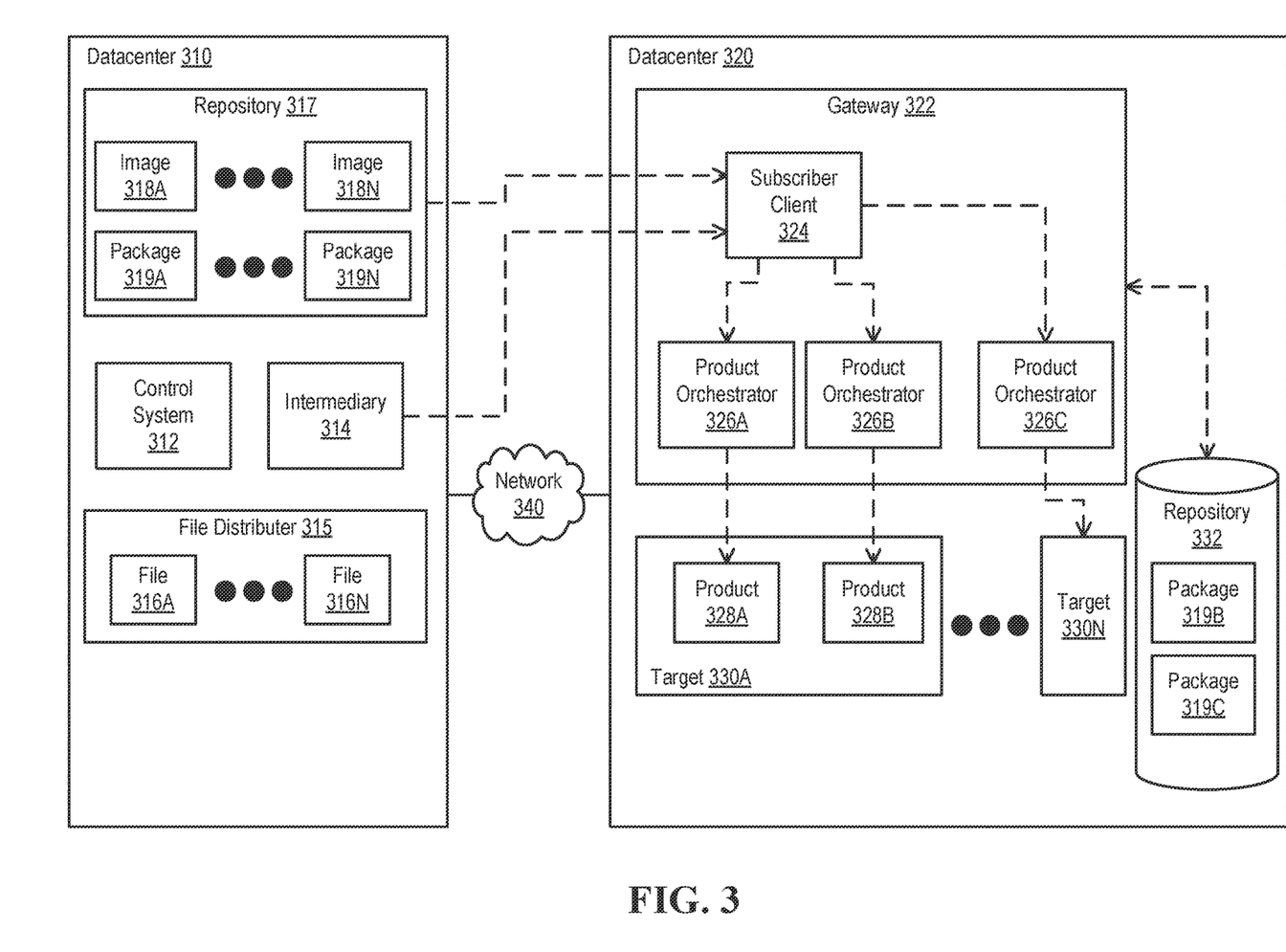
FIG. 3 illustrates an example of multiple datacenters, according to one or more embodiments.

Turning now to FIG. 3, an example of multiple datacenters is illustrated, according to one or more embodiments. In one or more embodiments, a first datacenter may be communicatively coupled to a second data center via a network. For example, a datacenter 310 may be communicatively coupled to a datacenter 320 via a network 340. In one instance, datacenter 310 may be communicatively coupled to network 340. In another instance, datacenter 320 may be communicatively coupled to network 340. In one or more embodiments, network 340 may include a wired network, a wireless network, an optical network, or a combination of the foregoing, among others. For example, network 340 may include and/or be coupled to various types of communications networks. For instance, network 340 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

In one or more embodiments, datacenter 310 may include a control system 312. For example, control system 312 may control software provisioning for a datacenter. For instance, control system 312 may control packages that may be deployed to a datacenter. In one or more embodiments, control system 312 may stage a software solution, which may be deployed to a datacenter, on a file distributer 315. For example, file distributer 315 include files 316A-316N. Although files 316A-316N are illustrated, file distributer 315 may include any number files 316, according to one or more embodiments. In one or more embodiments, file distributer 315 may provide multi-tenanted secure file distribution capabilities. For example, file distributer 315 may provide large deployment files. For instance, file distributer 315 may provide virtual appliances, operating systems (e.g., ISO images), and applications (e.g., application binaries), which may be distributed by control system 312. As an example, file distributer 315 may provide files, which may be distributed by control system 312 for provisioning purposes.

In one or more embodiments, datacenter 310 may include an intermediary 314. In one example, intermediary 314 may receive messages, which may include information, from clients. In a second example, intermediary 314 may filter the messages. For instance, intermediary 314 may filter the messages by one or more topics. In another example, intermediary 314 may distribute the messages, which may include the information, to subscribers. For instance, intermediary 314 may distribute the messages to clients, which may be subscribers. In one or more embodiments, there may be no direct communication between a client that publishes a message and a client that receives the message. In one example, a first client may publish a message to intermediary 314, and a second client may receive the message from intermediary 314. In another example, a client may publish a message to intermediary 314, and multiple other clients may receive the message from intermediary 314. In one or more embodiments, intermediary 314 may be or may include a message queue telemetry transport (MQTT) broker. In one example, at least a portion of intermediary 314 may be compliant with a MQTT specification. In another example, messages published to and received from intermediary 314 may be compliant with a MQTT protocol. For instance, at least a portion of a client may be compliant with a MQTT specification.

In one or more embodiments, file distributer 315 may distribute files. For example, file distributer 315 may provide files to a gateway 322 of datacenter 320. For instance, file distributer 315 may provide files to gateway 322 via network 340. In one or more embodiments, gateway 322 may be or may include an IHS 110. For example, gateway 322 may include one or more structures and/or one or more functionalities of IHS 110. In one or more embodiments, a file may include a package. For example, a package may include a software installation package, a RED HAT® package, a DEBIAN® package, a SOLARIS® package, etc. In one or more embodiments, a file may include an image file. For example, an image file may include an ISO image file, an APPLE® disk image file, etc. For instance, an image file may include a product 326. As an example, a product 326 may include one or more files.

In one or more embodiments, datacenter 310 may include a repository 317. In one example, repository 317 may be or may include an image repository. In another example, repository 317 may be or may include an image registry. In one or more embodiments, one or more product deployment orchestrators may be securely stored in repository 317. For example, the one or more product deployment orchestrators may be available to gateway 322. For instance, gateway 322 may download an image 318 from repository 317. As an example, gateway 322 may create one or more orchestrator containers from one or more images 318A-318N downloaded from repository 317. In one or more embodiments, repository 317 may store container images an image 318, which may be or include a container image. Although images 318A-318N are illustrated, repository 317 may store any number of images 318, according to one or more embodiments. In one or more embodiments, repository 317 may store software packages 319A-319N. Although packages 319A-319N are illustrated, repository 317 may store any number of packages 319, according to one or more embodiments.

In one or more embodiments, datacenter 320 may include gateway 322. For example, gateway 322 may be or may include an IHS 110. For instance, gateway 322 may include one or more structures and/or one or more functionalities as described with reference to IHS 110. As an example, gateway 322 may receive messages from intermediary 314. As another example, gateway 322 may mange one or more orchestrator containers. In one or more embodiments, gateway 322 may include a subscriber client 324. For example, subscriber client 324 may be an endpoint for messages. For instance, subscriber client 324 may receive messages from intermediary 314. As an example, subscriber client 324 may be or may include a MQTT client.

In one or more embodiments, subscriber client 324 may provision one or more containers. For example, subscriber client 324 may provision one or more containers based at least on one or more messages from intermediary 314. For instance, the one or more messages may include execution information for a product orchestrator 326. In one or more embodiments, a product orchestrator 326 may be or may include a container (e.g., an operating system virtualization). For example, a product orchestrator 326 may be or may include a container (e.g., an operating system virtualization), which is based at least on an image 318. For instance, an image 318 may be or may include a container image. As an example, a container image may be instantiated as a container (e.g., an operating system virtualization).

In one or more embodiments, subscriber client 324 may receive an image 318 from repository 317. For example, subscriber client 324 may receive an image 318 from repository 317 via network 340. In one or more embodiments, subscriber client 324 may retrieve an image 318 from a repository 332. For example, datacenter 320 may include repository 332. In one or more embodiments, subscriber client 324 may create and/or instantiate a product orchestrator 326 from an image 318.

In one or more embodiments, data center 320 may include one or more targets 330 (e.g., one or more target information handling systems). For example, data center 320 may include targets 330A-330N. Although data center 320 is illustrated as including targets 330A-330N, data center 320 may include any number of targets 330, according to one or more embodiments. In one or more embodiments, a target 330 may be or may include an IHS 110. For example, a target 330 may include one or more structures and/or one or more functionalities described with reference to IHS 110.

In one or more embodiments, data center 320 may include one or more repositories 332. Although data center 320 is illustrated as including a single repository 332, data center 320 may include any number of repositories 332, according to one or more embodiments. In one or more embodiments, repository 332 may be or may include a network attached storage (NAS). In one or more embodiments, repository 332 may store credentials associated with datacenter 320. In one or more embodiments, repository 332 may receive a package 319 from gateway 322. For example, repository 332 may store one or more packages 319. Although repository 332 is illustrated as storing packages 319B and 319C, repository 332 may store any number of packages 319. In one or more embodiments, after a package 319 is received, package 319 may be stored via repository 332. In one example, after package 319B is received, package 319B may be stored via repository 332. In another example, after package 319C is received, package 319C may be stored via repository 332.

In one or more embodiments, a product orchestrator 326 may install a product 328 on a target 330. In one example, product orchestrator 326A may install product 328A on target 330A. In another example, product orchestrator 326B may install product 328B on target 330A. In one or more embodiments, if repository 332 stores a package 319, a product orchestrator 326 may install a product 328 on a target 330 from package 319 stored via repository 332. For example, one or more of subscriber client 324 and product orchestrator 326B may determine that repository 332 stores package 319B. For instance, product orchestrator 326B may install product 328B on target 330A from package 319B stored via repository 332.

In one or more embodiments, if repository 332 does not store a package 319, a product orchestrator 326 may install a product 328 on a target 330 from package 319 stored via repository 317. For example, one or more of subscriber client 324 and product orchestrator 326A may determine that repository 332 does not store package 319A. For instance, product orchestrator 326B may install product 328A on target 330A from package 319B stored via repository 317. As an example, product orchestrator 326A may receive package 319A from datacenter 310 via network 340. For instance, after product orchestrator 326A receives package 319A, one or more of subscriber client 324 and product orchestrator 326A may store package 319A via repository 332, which is not specifically illustrated.

In one or more embodiments, an OS may be provisioned to a target 330 via a BMC 130 of target 330. For example, BMC 130 of target 330N may provide an OS image to a processor 120 of target 330N. For instance, package 319C may include the OS image. As an example, package 319C may be or may include an ISO image, which may be or may include the OS image. In one or more embodiments, BMC 130 of target 330N may provide an OS image to a processor 120 of target 330N via a virtual media device. In one or more embodiments, a product orchestrator 326C may configure BMC 130 of target 330N. For example, product orchestrator 326C may configure BMC 130 of target 330N via a first REDFISH® call to BMC 130 of target 330N. For instance, the first REDFISH® call to BMC 130 of target 330N may configure and/or instruct BMC 130 of target 330N to provide a virtual media device to processor 120 of target 330N. As example, BMC 130 of target 330N may configure target 330N to boot from the virtual media device. In one instance, product orchestrator 326C may include a web server (e.g., a hypertext transfer protocol (HTTP) server), which may provide the OS image to processor 120 of target 330N. In another instance, product orchestrator 326C may include a network file system (NFS) server, which may provide the OS image to processor 120 of target 330N.

In one or more embodiments, target 330N may be rebooted. For example, BMC 130 may reboot target 330N. For instance, product orchestrator 326C may provide a second REDFISH® call to BMC 130 of target 330N, which may configure and/or instruct BMC 130 of target 330N to reboot target 330N. In one or more embodiments, target 330N may boot from package 319C, which may be provided by product orchestrator 326C. In one example, target 330N may boot from package 319C, which may be provided by a HTTP server (e.g., a web server) of product orchestrator 326C. In one instance, the HTTP server may provide package 319C, which may be or may include the OS image, to processor 120 of target 330N. In another instance, processor 120 of target 330N may access package 319C, which may be or may include the OS image, via a HTTP. In another example, target 330N may boot from package 319C, which may be provided by a NFS server of product orchestrator 326C. In one instance, the NFS server of product orchestrator 326C may provide package 319C, which may be or may include the OS image, to processor 120 of target 330N. In another instance, processor 120 of target 330N may access package 319C, which may be or may include the OS image, via a NFS protocol.

Figure 4:
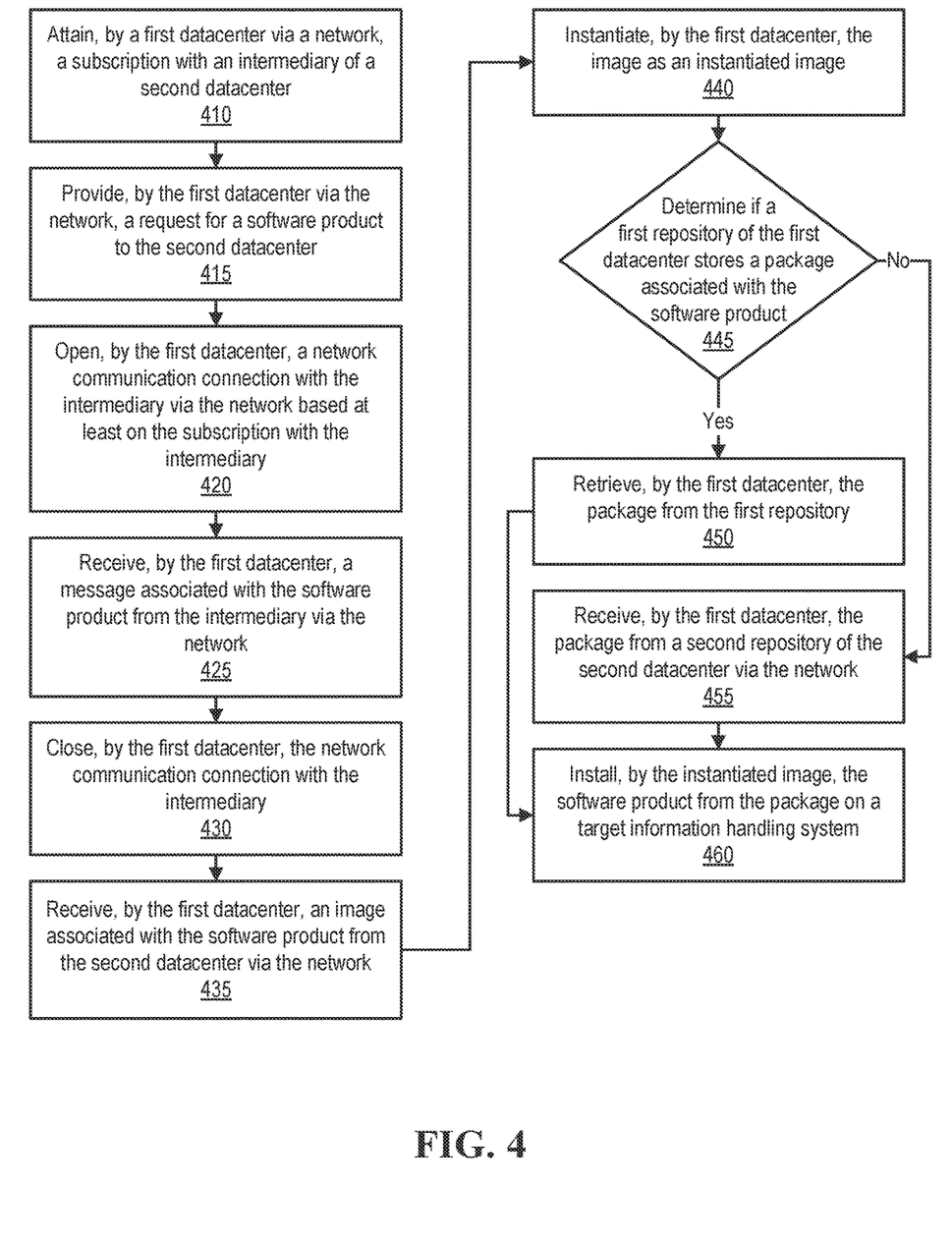
FIG. 4 illustrates an example of a method of installing software products, according to one or more embodiments.

Turning now to FIG. 4, an example of a method of installing software products is illustrated, according to one or more embodiments. At 410, a first datacenter may attain a subscription with an intermediary of a second datacenter via a network. For example, a first datacenter 320 may attain a subscription with intermediary 314 of a second datacenter 310 via network 340. For instance, gateway 322 may attain a subscription with intermediary 314 of datacenter 310 via network 340. As an example, subscriber client 324 may attain a subscription with intermediary 314 of datacenter 310 via network 340. In one or more embodiments, attaining the subscription with the intermediary of the second datacenter may include subscribing to the intermediary. In one or more embodiments, the intermediary of the second datacenter may be or may include a MQTT message broker. For example, receiving the message associated with the software product includes may include receiving the message associated with the software product from the intermediary via a MQTT compliant communication protocol.

At 415, the first datacenter may provide a request for a software product to the second datacenter via a network. For example, datacenter 320 may provide a request for a software product 328 to datacenter 310 via network 340. For instance, datacenter 320 may provide a request for a software product 328 to control system 312 of datacenter 310 via network 340. As an example, datacenter 320 may provide the request for software product 328 to datacenter 310 via an application programming interface (API).

At 420, the first datacenter may open a network communication connection with the intermediary via the network based at least on the subscription with the intermediary. For example, datacenter 320 may open a network communication connection with intermediary 314 via network 310 based at least on the subscription with intermediary 314. For instance, subscriber client 324 may open a network communication connection with intermediary 314 via network 310 based at least on the subscription with intermediary 314. In one or more embodiments, opening the network communication connection with the intermediary may include utilizing a cryptographic protocol configured to provide communications security over the network.

At 425, the first datacenter may receive a message associated with the software product from the intermediary via the network, in which the message is associated with the subscription and is specific to the first datacenter. For example, datacenter 320 may receive a message associated with software product 328 from intermediary 314 via network 340. For instance, subscriber client 324 may receive the message associated with software product 328 from intermediary 314 via network 340. In one or more embodiments, the message may be associated with the subscription and may be specific to datacenter 310. In one or more embodiments, control system 312 may have provided the message to intermediary 314. For example, control system 312 may have created and/or provided the message to intermediary 314 in response to receiving the request for software product 328. For instance, control system 312 may have created and/or provided the message to intermediary 314 in response to receiving the request for software product 328 via the API.

At 430, the first datacenter may close the network communication connection with the intermediary. For example, datacenter 320 may close the network communication connection with intermediary 314. For instance, subscriber client 324 may close the network communication connection with intermediary 314. At 435, the first datacenter may receive an image associated with the software product from the second datacenter via the network. For example, datacenter 320 may receive an image 318 associated with software product 328 from datacenter 310 via network 340.

At 440, the first datacenter may instantiate the image as an instantiated image. For example, gateway 322 may instantiate the image as the instantiated image. In one or more embodiments, the image may include a container image. For example, instantiating the image as the instantiated image may include instantiating the container image as a container. For instance, a product orchestrator 326, associated with software product 328, may be or may include the container. As an example, image 318, associated with software product 328, may be instantiated as product orchestrator 326.

At 445, it may be determined if a first repository of the first datacenter stores a package associated with the software product. For example, the first datacenter may determine if a first repository of the first datacenter stores a package associated with the software product. For instance, datacenter 320 may determine if repository 332 of datacenter 320 stores a package 319 associated with software product 328. As an example, subscriber client 324 may determine if repository 332 of datacenter 320 stores a package 319 associated with software product 328. As another example, product orchestrator 326 may determine if repository 332 of datacenter 320 stores a package 319 associated with software product 328.

If the first repository stores the package, the first datacenter may retrieve the package from the first repository, at

450. For example, datacenter 320 may retrieve package 319 from repository 332. For instance, gateway 322 may retrieve package 319 from repository 332. As an example, subscriber client 324 may retrieve package 319 from repository 332. As another example, product orchestrator 326 may retrieve package 319 from repository 332.

If the first repository does not store the package, the first datacenter may receive the package from a second repository of the second datacenter via the network, at 455. For example, datacenter 320 may receive package 319 from repository 317 of datacenter 310 via network 340. For instance, gateway 322 may receive package 319 from repository 317 of datacenter 310 via network 340. As an example, subscriber client 324 may receive package 319 from repository 317 of datacenter 310 via network 340. As another example, product orchestrator 326 may receive package 319 from repository 317 of datacenter 310 via network 340.

At 460, the instantiated image may install the software product from the package on a target information handling system. For example, product orchestrator 326 may install software product 328 from package 317 on a target information handling system 330. For instance, gateway 322 may install software product 328 from package 317 on a target information handling system 330. As an example, gateway 322 may execute product orchestrator 326, which may install software product 328 from package 317 on a target information handling system 330.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system of a first datacenter, comprising:
at least one processor; and
a memory medium, coupled to the at least one processor, that stores instructions executable by the at least one processor, which when executed by the at least one processor, cause the information handling system to:
attain, via a network, a subscription with an intermediary of a second datacenter;
provide, via the network, a request for a software product to the second datacenter;
open a network communication connection with the intermediary via the network based at least on the subscription with the intermediary;
receive a message associated with the software product from the intermediary via the network, wherein the message is associated with the subscription and is specific to the first datacenter;
close the network communication connection with the intermediary;
receive an image associated with the software product from the second datacenter via the network, wherein the image includes a container image;
instantiate the image as an instantiated image, including provisioning a container based on the container image, the container being an operating system virtualization;
determine if a first repository of the first datacenter stores a package associated with the software product, the package including an operating system (OS) image;
if the first repository stores the package, retrieve the package from the first repository;
if the first repository does not store the package, receive the package from a second repository of the second datacenter via the network; and
install, by the operating system virtualization, the software product from the package on a target information handling system, wherein the OS is provisioned at the target information handling system from the OS image of the software product.

2. The information handling system of claim 1, wherein the network includes an Internet.

3. The information handling system of claim 1,
wherein the intermediary of the second datacenter includes a message queue telemetry transport (MQTT) message broker; and
wherein, to receive the message associated with the software product, the instructions further cause the information handling system to receive the message associated with the software product from the intermediary via a MQTT compliant communication protocol.

4. The information handling system of claim 1, wherein the instructions further cause the information handling system to:
if the first repository does not store the package, after receiving the package from the second repository, store the package via the first repository.

5. The information handling system of claim 1, wherein, to attain the subscription with the intermediary of the second datacenter, the instructions further cause the information handling system to subscribe to the intermediary.

6. The information handling system of claim 1, wherein, to open the network communication connection with the intermediary, the instructions further cause the information handling system to utilize a cryptographic protocol configured to provide communications security over the network.

7. A method, comprising:
attaining, by a first datacenter via a network, a subscription with an intermediary of a second datacenter;
providing, by the first datacenter via the network, a request for a software product to the second datacenter;

opening, by the first datacenter, a network communication connection with the intermediary via the network based at least on the subscription with the intermediary;

receiving, by the first datacenter, a message associated with the software product from the intermediary via the network, wherein the message is associated with the subscription and is specific to the first datacenter;

closing, by the first datacenter, the network communication connection with the intermediary;

receiving, by the first datacenter, an image associated with the software product from the second datacenter via the network, wherein the image includes a container image;

instantiating, by the first datacenter, the image as an instantiated image, including provisioning a container based on the container image, the container being an operating system virtualization;

determining if a first repository of the first datacenter stores a package associated with the software product, the package including an operating system (OS) image;

if the first repository stores the package, retrieving, by the first datacenter, the package from the first repository;

if the first repository does not store the package, receiving, by the first datacenter, the package from a second repository of the second datacenter via the network; and installing, by the operating system virtualization, the software product from the package on a target information handling system, wherein the OS is provisioned at the target information handling system from the OS image of the software product.

8. The method of claim 7, wherein the network includes an Internet.

9. The method of claim 7,
wherein the intermediary of the second datacenter includes a message queue telemetry transport (MQTT) message broker; and
wherein the receiving the message associated with the software product includes receiving the message associated with the software product from the intermediary via a MQTT compliant communication protocol.

10. The method of claim 7, further comprising:
if the first repository does not store the package, after the receiving the package from the second repository, storing the package via the first repository.

11. The method of claim 7, wherein the attaining the subscription with the intermediary of the second datacenter includes subscribing to the intermediary.

12. The method of claim 7, wherein the opening the network communication connection with the intermediary includes utilizing a cryptographic protocol configured to provide communications security over the network.

13. A computer-readable non-transitory memory medium that includes instructions that, when executed by at least one processor of an information handling system of a first datacenter, cause the information handling system to:
attain, via a network, a subscription with an intermediary of a second datacenter;

provide, via the network, a request for a software product to the second datacenter;

open a network communication connection with the intermediary via the network based at least on the subscription with the intermediary;

receive a message associated with the software product from the intermediary via the network, wherein the message is associated with the subscription and is specific to the first datacenter;

close the network communication connection with the intermediary;

receive an image associated with the software product from the second datacenter via the network, wherein the image includes a container image;

instantiate the image as an instantiated image, including provisioning a container based on the container image, the container being an operating system virtualization;

determine if a first repository of the first datacenter stores a package associated with the software product, the package including an operating system (OS) image;

if the first repository stores the package, retrieve the package from the first repository;

if the first repository does not store the package, receive the package from a second repository of the second datacenter via the network; and install, by the operating system virtualization, the software product from the package on a target information handling system, wherein the OS is provisioned at the target information handling system from the OS image of the software product.

14. The computer-readable non-transitory memory medium of claim 13,
wherein the intermediary of the second datacenter includes a message queue telemetry transport (MQTT) message broker; and
wherein, to receive the message associated with the software product, the instructions further cause the information handling system to receive the message associated with the software product from the intermediary via a MQTT compliant communication protocol.

15. The computer-readable non-transitory memory medium of claim 13, wherein the instructions further cause the information handling system to:
if the first repository does not store the package, after receiving the package from the second repository, store the package via the first repository.

16. The computer-readable non-transitory memory medium of claim 13, wherein, to attain the subscription with the intermediary of the second datacenter, the instructions further cause the information handling system to subscribe to the intermediary.

17. The computer-readable non-transitory memory medium of claim 13, wherein, to open the network communication connection with the intermediary, the instructions further cause the information handling system to utilize a cryptographic protocol configured to provide communications security over the network.

* * * * *